(12) United States Patent
Yuan et al.

(10) Patent No.: US 12,228,816 B2
(45) Date of Patent: Feb. 18, 2025

(54) DISPLAY PANEL AND MANUFACTURE METHOD THEREOF, DISPLAY APPARATUS

(71) Applicant: BOE TECHNOLOGY GROUP CO., LTD., Beijing (CN)

(72) Inventors: Guangcai Yuan, Beijing (CN); Haixu Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/527,625

(22) Filed: Dec. 4, 2023

(65) Prior Publication Data

US 2024/0103315 A1    Mar. 28, 2024

Related U.S. Application Data

(63) Continuation of application No. 17/281,675, filed as application No. PCT/CN2020/118615 on Sep. 29, 2020, now Pat. No. 11,874,551.

(30) Foreign Application Priority Data

Sep. 30, 2019 (CN) .......................... 201910943284.0

(51) Int. Cl.
  *G02F 1/1335*    (2006.01)
  *G02F 1/13357*   (2006.01)
(52) U.S. Cl.
  CPC .................. *G02F 1/133536* (2013.01); *G02F 1/133516* (2013.01); *G02F 1/133531* (2021.01); *G02F 1/133548* (2021.01); *G02F 1/133602* (2013.01)
(58) Field of Classification Search
  None
  See application file for complete search history.

(56) References Cited

U.S. PATENT DOCUMENTS 5,841,492 A * 11/1998 Iwauchi .............. G02F 1/13475
                                                  349/74
6,184,951 B1 * 2/2001 Harrold ............... G02F 1/13473
                                                  349/86
(Continued)

FOREIGN PATENT DOCUMENTS

CN       106353913 A      1/2017
CN       108761888 A     11/2018
(Continued)

OTHER PUBLICATIONS

International Search Report of PCT/CN2020/118615 in Chinese, mailed Dec. 7, 2020 with English translation.
Notice of Transmittal of the International Search Report of PCT/CN2020/118615 in Chinese, mailed Dec. 7, 2020.
(Continued)

*Primary Examiner* — Phu Vu
(74) *Attorney, Agent, or Firm* — Collard & Roe, P.C.; William Collard

(57) ABSTRACT

A display panel and a manufacture method thereof, and a display apparatus are provided. The display liquid crystal panel includes a first substrate and a second substrate opposite to each other; the light control panel includes a third substrate and a fourth substrate opposite to each other. The second substrate and the third substrate are between the first substrate and the fourth substrate. The light control liquid crystal layer is between the first polarizer and the second polarizer; the first polarizer is between the second polarizer and the third polarizer, and the display liquid crystal layer is between the first polarizer and the third polarizer. The first polarizer, the second polarizer, and the third polarizer are configured to allow backlight to emit out of the fourth substrate after passing through the second polarizer, the first polarizer, and the third polarizer in sequence.

14 Claims, 10 Drawing Sheets

(56) References Cited

U.S. PATENT DOCUMENTS

| | | | |
|---|---|---|---|
| 11,874,551 B2* | 1/2024 | Yuan | G02F 1/133531 |
| 2005/0088739 A1* | 4/2005 | Chiu | G02B 5/3058 |
| | | | 359/485.05 |
| 2007/0296889 A1 | 12/2007 | Struk | |
| 2008/0106680 A1* | 5/2008 | Chen | G02F 1/1347 |
| | | | 349/114 |
| 2011/0164207 A1 | 7/2011 | Arai et al. | |
| 2019/0137817 A1* | 5/2019 | Yasui | G02F 1/133536 |
| 2020/0271995 A1* | 8/2020 | Weindorf | G02F 1/133606 |
| 2021/0080767 A1 | 3/2021 | Liao et al. | |

FOREIGN PATENT DOCUMENTS

| | | | |
|---|---|---|---|
| CN | 109031771 A | | 12/2018 |
| CN | 109917581 A | | 6/2019 |
| CN | 110007509 A | | 7/2019 |
| KR | 20060012197 A | * | 2/2006 |

OTHER PUBLICATIONS

Written Opinion of the International Searching Authority of PCT/CN2020/118615 in Chinese, mailed Dec. 7, 2020 with English translation.

U.S.Office Action in U.S. Appl. No. 17/281,675 dated Feb. 13, 2023.

Reissued U.S.Office Action in U.S. Appl. No. 17/281,675 dated May 12, 2023.

Notice of Allowance in U.S. Appl. No. 17/281,675 dated Sep. 19, 2023.

\* cited by examiner

Display Image Under Local
Dimming Technology

Brightness of Backlight
Regions

DISPLAY PANEL AND MANUFACTURE METHOD THEREOF, DISPLAY APPARATUS

CROSS-REFERENCE

This patent application is a continuation of U.S. Ser. No. 17/281,675 filed on Mar. 31, 2021 which is a national stage application of international application PCT/CN2020/118615 filed on Sep. 29, 2020 and claims the priority of the Chinese Patent Application No. 2019109432840 filed on Sep. 30, 2019, the entire contents of all these applications are hereby incorporated by reference herein in its entirety.

TECHNICAL FIELD

At least one embodiment of the present disclosure relates to a display panel, a manufacture method thereof, and a display apparatus.

BACKGROUND

For a display liquid crystal panel, the display image quality of the display panel can be improved by combining local dimming technology (LD). In order to use the local dimming technology in, for example, a side-in type backlight unit, it is required to provide a light control panel between the display liquid crystal panel and the side-in type backlight unit. The light control panel can control the light transmittance in a predetermined region, for a part, with high brightness (grayscale), of an image the light transmittance of the corresponding region of the light control panel is also high, and this corresponding region of the light control panel allows more light from the backlight unit to pass through. For a part, with low brightness, of an image, the light transmittance of the corresponding region of the light control panel is also low, and this corresponding region of the light control panel allows less light from the backlight unit to pass through, thereby achieving the purpose of improving the contrast of the display image and enhancing the quality of the display image.

SUMMARY

At least one embodiment of the present disclosure provides a display panel, the display panel includes a display liquid crystal panel and a light control panel that are stacked, a first polarizer, a second polarizer, and a third polarizer. The display liquid crystal panel includes a first substrate and a second substrate that are opposite to each other, and a display liquid crystal layer between the first substrate and the second substrate; the light control panel includes a third substrate and a fourth substrate that are opposite to each other, and a light control liquid crystal layer between the third substrate and the fourth substrate. The second substrate and the third substrate are between the first substrate and the fourth substrate. The light control liquid crystal layer is between the first polarizer and the second polarizer; the first polarizer is between the second polarizer and the third polarizer, and the display liquid crystal layer is between the first polarizer and the third polarizer; the first polarizer, the second polarizer, and the third polarizer are configured to allow backlight to emit out of the display panel after passing through the second polarizer, the first polarizer, and the third polarizer in sequence.

For example, in the display panel provided by an embodiment of the present disclosure, the second polarizer is a reflective polarizer.

For example, in the display panel provided by an embodiment of the present disclosure, the first polarizer is between the second substrate and the third substrate, and the first polarizer is a transmissive polarizer.

For example, in the display panel provided by an embodiment of the present disclosure, the first polarizer is between the second substrate and the third substrate, and the first polarizer is a reflective polarizer.

For example, in the display panel provided by an embodiment of the present disclosure, the first polarizer is a reflective polarizer, and the first polarizer is opposite to the second polarizer.

For example, in the display panel provided by an embodiment of the present disclosure, the reflective polarizer is a wire-grid polarizer (WGP).

For example, in the display panel provided by an embodiment of the present disclosure, the second substrate and the third substrate constitute an integral structure, the integral structure serves as a common substrate, and the display liquid crystal panel and the light control panel share the common substrate; the common substrate is a display array substrate, and a display array component is provided on a first side of the common substrate close to the first substrate; and the first polarizer is on a second side of the common substrate close to the fourth substrate.

For example, in the display panel provided by an embodiment of the present disclosure, the first substrate is a color filter substrate, the third polarizer is on a side of the first substrate away from the common substrate, and the third polarizer is a transmissive polarizer.

For example, in the display panel provided by an embodiment of the present disclosure, the first substrate is a color filter substrate, and a color filter layer is provided on a first side of the first substrate close to the common substrate; and the third polarizer is a reflective polarizer, is on the first side of the first substrate and on a side of the color filter layer close to the first substrate.

For example, in the display panel provided by an embodiment of the present disclosure, the second substrate and the third substrate constitute an integral structure, the integral structure serves as a common substrate, and the display liquid crystal panel and the light control panel share the common substrate; the common substrate is a color filter substrate, and a color filter layer is provided on a first side of the common substrate close to the first substrate; and the first polarizer is on the first side of the common substrate close to the first substrate and on a side of the color filter layer close to the common substrate, or, the first polarizer is on a second side of the common substrate close to the fourth substrate.

For example, in the display panel provided by an embodiment of the present disclosure, the first substrate is a display array substrate, the third polarizer is on a side of the first substrate away from the common substrate, and the third polarizer is a transmissive polarizer.

For example, in the display panel provided by an embodiment of the present disclosure, the fourth substrate is a light control array substrate, a light control array component is provided on a first side of the fourth substrate close to the liquid crystal display panel, and the second polarizer is on a second side of the fourth substrate away from the common substrate.

For example, the display panel provided by an embodiment of the present disclosure further comprises a first protection layer covering the second polarizer; a material of the first protection layer is silicon oxide or silicon nitride, and a thickness of the first protection layer is greater than or equal to 4500 angstroms.

For example, in the display panel provided by an embodiment of the present disclosure, a polarization direction of the first polarizer is perpendicular to a polarization direction of the second polarizer; and a polarization direction of the third polarizer is perpendicular to the polarization direction of the second polarizer.

For example, in the display panel provided by an embodiment of the present disclosure, the reflective polarizer is a wire-grid polarizer (WGP).

At least one embodiment of the present disclosure provides a display apparatus, the display apparatus comprises the display panel provided by any one of the embodiments of the present disclosure, and a backlight source which is on a side of the light control panel away from the display liquid crystal panel, and is configured to allow backlight from the backlight source enter the display liquid crystal panel after passing through the light control panel.

At least one embodiment of the present disclosure provides a manufacture method of a display panel, and the manufacture method comprises: forming a display liquid crystal panel and a light control panel that are stacked, in which the display liquid crystal panel comprises a first substrate and a second substrate that are opposite to each other, and a display liquid crystal layer between the first substrate and the second substrate; the light control panel comprises a third substrate and a fourth substrate that are opposite to each other, and a light control liquid crystal layer between the third substrate and the fourth substrate; and the second substrate and the third substrate are between the first substrate and the fourth substrate; forming a first polarizer; forming a second polarizer, in which the light control liquid crystal layer is between the first polarizer and the second polarizer; and forming a third polarizer, in which the first polarizer is between the second polarizer and the third polarizer, and the display liquid crystal layer is between the first polarizer and the third polarizer; the first polarizer, the second polarizer, and the third polarizer are configured to allow backlight to emit out of the display panel after passing through the second polarizer, the first polarizer, and the third polarizer in sequence.

For example, in the manufacture method of the display panel provided by an embodiment of the present disclosure, the second polarizer is a reflective polarizer.

For example, in the manufacture method of the display panel provided by an embodiment of the present disclosure, the second substrate and the third substrate constitute an integral structure, the integral structure serves as a common substrate, the display liquid crystal panel and the light control panel share the common substrate, and the common substrate is a display array substrate; the manufacture method comprises: forming a display array component on a first side of the common substrate; forming a color filter layer on a first side of the first substrate; assembling the first substrate and the common substrate to form the display liquid crystal panel, wherein the color filter layer and the display array component are between the common substrate and the first substrate and are opposite to each other; and forming the first polarizer on a second side of the common substrate opposite to the first side of the common substrate after assembling the first substrate and the common substrate.

For example, in the manufacture method of the display panel provided by an embodiment of the present disclosure, the first polarizer is a reflective polarizer, and the first polarizer is opposite to the second polarizer.

For example, in the manufacture method of the display panel provided by an embodiment of the present disclosure, the reflective polarizer is a wire-grid polarizer (WGP), and a process for forming the reflective polarizer comprises an etching process and a nanoimprint process.

For example, the manufacture method of the display panel provided by an embodiment of the present disclosure further comprises: forming the third polarizer on a second side of the first substrate away from the common substrate after assembling the first substrate and the common substrate, in which the third polarizer is a transmissive polarizer.

For example, in the manufacture method of the display panel provided by an embodiment of the present disclosure, the forming the color filter layer on the first side of the first substrate comprises: forming the third polarizer on the first side of the first substrate, wherein the third polarizer is a wire-grid polarizer; and forming the color filter layer on a side of the third polarizer away from the first substrate after forming the wire-grid polarizer.

For example, the manufacture method of the display panel provided by an embodiment of the present disclosure further comprises: forming the second polarizer on a first side of the fourth substrate; forming a light control array component on a second side of the fourth substrate opposite to the first side of the fourth substrate after forming the second polarizer; assembling the fourth substrate and the common substrate to form the light control panel, in which the light control array component is on the second side of the fourth substrate close to the common substrate; and injecting liquid crystals respectively between the first substrate and the common substrate and between the fourth substrate and the common substrate.

For example, the manufacture method of the display panel provided by an embodiment of the present disclosure further comprises: forming a sacrifice protection layer covering the second polarizer before forming the light control array component; and removing the sacrifice protection layer after forming the light control array component.

For example, the manufacture method of the display panel provided by an embodiment of the present disclosure further comprises: forming a protection layer before forming the sacrifice protection layer, wherein the sacrifice protection layer further covers the protection layer.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

DETAILED DESCRIPTION

Figure 1A:
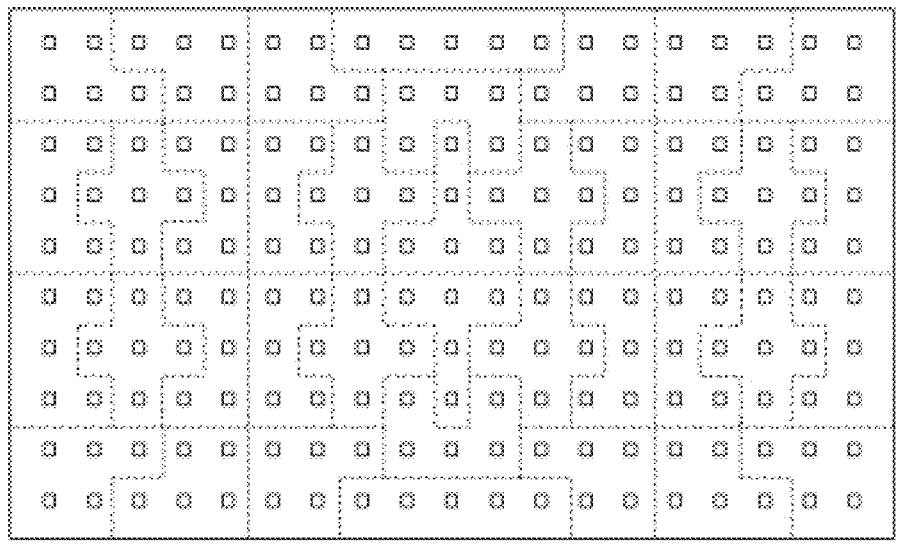
FIG. 1A and FIG. 1B are schematic diagrams of local dimming.

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art may obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "comprise/comprising," or the like are intended to specify that the elements or the objects stated before these terms encompass the elements or the objects and equivalents thereof listed after these terms, but not preclude other elements or objects. The terms "inside," "outside", "on," "under" or the like are only used to indicate relative position relationship, and when the position of the object which is described is changed, the relative position relationship may be changed accordingly.

Dimensions of the drawings in the present disclosure are not strictly drawn to the actual scale, and the number of pixel units of colors in the display panel are not limited to the number illustrated in the drawings. The specific size and the number of each structure can be determined according to actual needs. The drawings described in the present disclosure are merely structural schematic diagrams.

The local dimming technology can divide the entire backlight unit into a plurality of backlight blocks that are driven individually, and each of the backlight blocks comprises one or more LEDs. According to gray levels that need to be displayed in different portions of a display image, driving currents of the LEDs of the backlight blocks corresponding to these portions are automatically adjusted, and the brightness of each portion of the backlight unit can be adjusted individually, thereby improving the contrast of the display image. For example, in an exemplary direct type backlight unit, a schematic diagram of region division of LED light sources in the entire backplane is illustrated in FIG. 1A. A small square in the figure represents one LED unit, and a plurality of regions separated by dashed lines represent a plurality of backlight regions. Each of the backlight regions comprises one or more LED units and can be controlled independently of other backlight regions. For example, the LEDs in each of the backlight regions are linked, that is, the same current passes through the LEDs in the same backlight region.

Figure 1B:
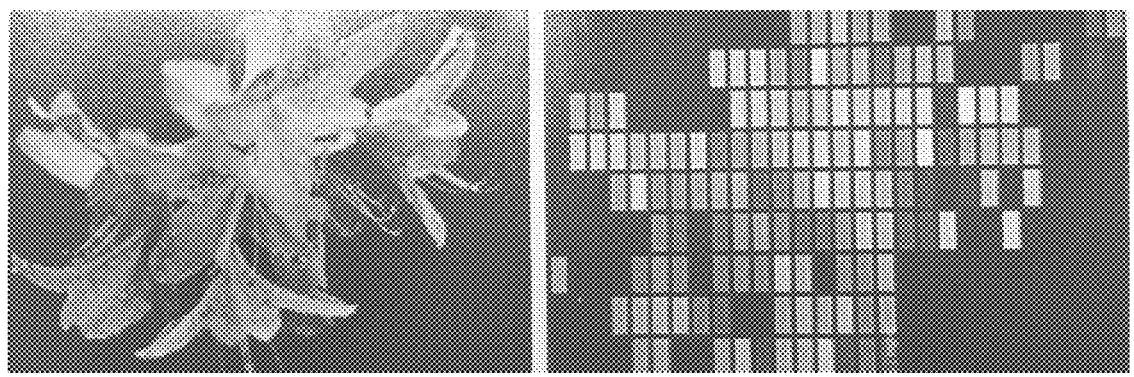

The local dimming technology can adjust the brightness of the corresponding backlight block according to the grayscale of the image content displayed by the liquid crystal display panel. FIG. 1B is a schematic diagram illustrating the display brightness of the display image and the backlight block corresponding to the display image after a local dimming process. As illustrated in FIG. 1B, the backlight unit comprises a plurality of rectangular backlight regions arranged in an array. The local dimming technology can adjust the brightness of the corresponding backlight block according to the grayscale of the image content displayed by the liquid crystal display panel. For the portion that the brightness (grayscale) of the image is higher, the brightness of the corresponding backlight block is higher, and for the portion that the brightness of the image is lower, the brightness of the corresponding backlight block is lower. Therefore, the purposes of reducing the backlight power consumption, improving the contrast of the display image, and enhancing the quality of the display image are achieved.

However, the above-mentioned local dimming technology is applicable to the direct type backlight unit, and the LEDs used as light sources are evenly distributed on the entire backplane, for example. In order to apply the local dimming technology to, for example, a side-in type backlight unit, it is necessary to add a light control panel between the display liquid crystal panel and the side-in type backlight unit. The light control panel can control the light transmittance in a predetermined region. For a portion of the display image in which the brightness (grayscale) is higher, the light transmittance of the a region, corresponding to this portion of the display image, of the light control panel is also higher, so as to allow more light emitted from the backlight unit to pass through this portion of the light control panel; for a portion of the display image in which the brightness of the image is lower, the light transmittance of a region, corresponding to this portion of the display image, of the light control panel is also lower, so as to allow less light emitted from the backlight unit to pass through this portion of the light control panel, thereby achieving the purposes of improving the contrast of the display image and enhancing the quality of the display image. In addition, in the case where the direct type backlight unit is directly formed on a direct type backlight source, it is difficult to divide the backlight unit to achieve a high density (the number of the backlight unit per unit area) and a high accuracy. In the case where the division density and accuracy requirements of the light control unit are high, these requirements can be achieved using the light control panel, and the manufacture process of the light control panel is easy to be implemented.

In this type of local dimming display panel, light from the backlight source passes through the light control panel and the display liquid crystal panel in sequence, the light transmittance is usually low. Therefore, it is of great significance to improve the light transmittance of this type of display panel.

At least one embodiment of the present disclosure provides a display panel, the display panel includes a display liquid crystal panel and a light control panel that are stacked, a first polarizer, a second polarizer, and a third polarizer. The display liquid crystal panel includes a first substrate and a second substrate that are opposite to each other, and a display liquid crystal layer between the first substrate and the second substrate; the light control panel includes a third substrate and a fourth substrate that are opposite to each other, and a light control liquid crystal layer between the third substrate and the fourth substrate. The second substrate and the third substrate are between the first substrate and the fourth substrate. The light control liquid crystal layer is between the first polarizer and the second polarizer; the first polarizer is between the second polarizer and the third polarizer, and the display liquid crystal layer is between the first polarizer and the third polarizer; the first polarizer, the second polarizer, and the third polarizer are configured to allow backlight to emit out of the display panel after passing through the second polarizer, the first polarizer, and the third polarizer in sequence.

Figure 2A:
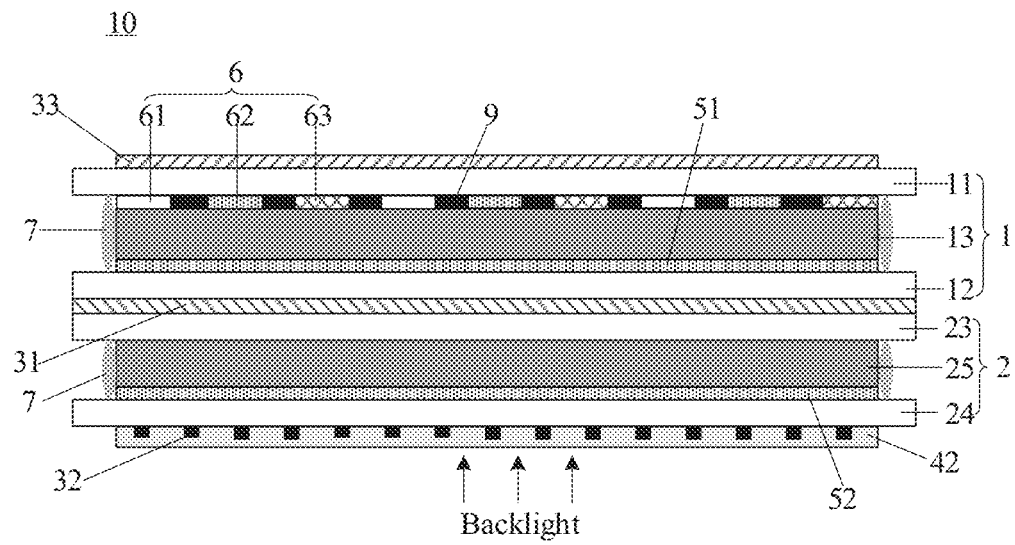
FIG. 2A is a first schematic cross-sectional view of a display panel provided by an embodiment of the present disclosure.

Exemplarily, FIG. 2A is a first schematic cross-sectional view of a display panel provided by an embodiment of the present disclosure. As shown in FIG. 2A, the display panel 10 provided by the embodiment of the present disclosure includes a display liquid crystal panel 1 and a light control panel 2 that are stacked, a first polarizer 31, a second polarizer 32, and a third polarizer 33. The display liquid crystal panel 1 includes a first substrate 11 and a second substrate 12 that are opposite to each other, and a display liquid crystal layer 13 located between the first substrate 11 and the second substrate 12; the light control panel 2 includes a third substrate 23 and a fourth substrate 24 that are opposite to each other, and a light control liquid crystal layer 25 located between the third substrate 23 and the four substrates 24; the second substrate 12 and the third substrate 23 are located between the first substrate 11 and the fourth substrate 24. The light control liquid crystal layer 23 is located between the first polarizer 31 and the second polarizer 32; the first polarizer 31 is located between the second polarizer 32 and the third polarizer 33, and the display liquid crystal layer 13 is located between the first polarizer 31 and the third polarizer 33. The first polarizer 31, the second polarizer 32, and the third polarizer 33 are configured to allow backlight to emit out of the display panel after passing through the second polarizer 32, the first polarizer 31 and the third polarizer 33 in sequence. The backlight refers to light from a backlight source. The polarization direction of the first polarizer 31 is perpendicular to the polarization direction of the second polarizer 32; and the polarization direction of the third polarizer 33 is perpendicular to the polarization direction of the second polarizer 32. Therefore, the display liquid crystal panel 1 is used to realize the display function, and the light control panel 2 is used to control the direction or strength of the backlight incident to the display liquid crystal panel 1 according to requirements, for example, to realize the requirements of switching between a narrow viewing angle and a wide viewing angle, and controlling the luminous intensity of different positions of the display panel to be different. For example, the backlight may come from a direct type backlight source or a side-in type backlight source.

In at least one embodiment of the present disclosure, for example, the second polarizer 32 is a reflective polarizer, so that light entering the light control panel 2 can be reflected multiple times by the second polarizer 32, thereby improving the light transmittance of the display panel 10. Through experiments, under the same other conditions, the light transmittance of the light control panel 2 can reach more than 30%, and in the case where the second polarizer is a non-reflective polarizer, the light transmittance is less than 30%. Under the same conditions, the higher the light transmittance of the light control panel 2 is, the higher the light transmittance of the entire display panel 10 is. Therefore, in the embodiments of the present disclosure, under the same conditions of the liquid crystal display panel 1, the light transmittance data of the light control panel 2 is used to characterize the light transmittance of the entire display panel 10.

For example, the above-mentioned reflective polarizer may be a wire grid type polarizer, for example, a wire-grid polarizer (WGP), that is, the second polarizer is a wire-grid polarizer. The material of the wire-grid polarizer is white metal to improve the reflectivity of the second polarizer. The white metal is, for example, aluminum which not only has high reflectivity, but also has stable properties, low hardness and good ductility, and make is easy to manufacture the wire-grid polarizer.

As shown in FIG. 2A, for example, the first substrate 11 is a color filter substrate. For example, a color filter layer is provided on a side of the first substrate 11 close to the second substrate 12. The color filter layer includes a plurality of pixel units 6 arranged in an array, and each of the plurality of pixel units 6 includes a plurality of sub-pixels of different colors, and for example, each of the plurality of pixel units 6 includes a first color sub-pixel 61, a second color sub-pixel 62, and a third color sub-pixel 63. The backlight from the backlight source enters the display liquid crystal panel 1 after being controlled by the light control panel 2, and then exits after passing through the color filter layer. The second substrate 12 is a display array substrate, and a display array component 51 is provided on a side of the second substrate 12 close to the first substrate 11. The display array component 51 includes, for example, a pixel drive circuit; for example, the pixel drive circuit includes a thin film transistor (TFT) and other components for driving and controlling the display state of the display liquid crystal panel 1. For the specific structure of the display array component 51, those skilled in the art can use conventional technology to design.

For example, the fourth substrate 24 is a light control array substrate, a light control array component 52 is provided on a first side of the fourth substrate 24 close to the liquid crystal display panel 1, and the second polarizer 32 is located on a second side of the fourth substrate 24 away from the third substrate 23. The light control panel 2 includes a plurality of light control units arranged in an array, and can respectively control the dimming state of the plurality of light control units. For example, the light control array component 52 includes a thin film transistor (TFT) and other components for driving and controlling the dimming state of the plurality of the light control units. For the specific structure of the light control array component 52, those skilled in the art can use conventional technology to design.

For the simulation test of the light control panel 2 under different conditions, the simulation results are shown in Table 1. In the simulation test, a backlight source is provided, and the backlight source includes a light-emitting device and a reflective sheet. The reflective sheet is located on a side of the light-emitting device away from the light control panel 2. Light emitted by the light-emitting device enters the light control panel 2 and and then to emit out of the light control panel 2 after passing through the second polarizer 32 and the first polarizer 31 in sequence. The simulation test conditions are: the transmittance of the transmissive polarizer being in a range of 42%-43%, the transmittance of the WGP being 35%, the line width of each of the plurality of grids in the WGP being 70 nm, the distance between adjacent grids being 70 nm, and the height of each of the plurality of grids being 200 nm.

TABLE 1

| Type of the First Polarizer | Transmissive Polarizer | Transmissive Polarizer | WGP |
|---|---|---|---|
| Type of the Second Polarizer | Transmissive Polarizer | WGP | WGP |
| Light Transmittance (%) | 28.5 | 32.8 | 30.78 |

For example, in the embodiment shown in FIG. 2A, the first polarizer 31 is located between the second substrate 12 and the third substrate 23, and the first polarizer 31 is a transmissive polarizer. For example, the third polarizer 33 is located on the side of the first substrate 11 away from the second substrate 12, and the third polarizer 33 is a transmissive polarizer. In this case, the first polarizer 31 and the third polarizer 33 are both in an integral sheet structure instead of a wire grid structure, and both include an organic material. For example, the first polarizer 31 is an iodine-based polarizer, and the third polarizer 33 is an iodine-based polarizer. Of course, in other embodiments, the third polarizer 33 may be a dye-based polarizer. In this embodiment, it can be seen from Table 1 that through the simulation test on the light control panel 2, the light transmittance of the light control panel 2 in this embodiment can reach 32.8%. In the above simulation results, the light control panel 2 of this embodiment has the highest light transmittance, this is because the transmissive first polarizer 31 has the higher light transmittance, and it is especially easy to to obtain a higher light transmittance using an iodine-based polarizer, and the reflectivity of the second polarizer 32 is higher, so that the second polarizer 32 can increase the amount of light that passes through the first polarizer 31 after being reflected by the second polarizer 32, thereby significantly improving the light transmittance of the display panel 10.

Figure 3:
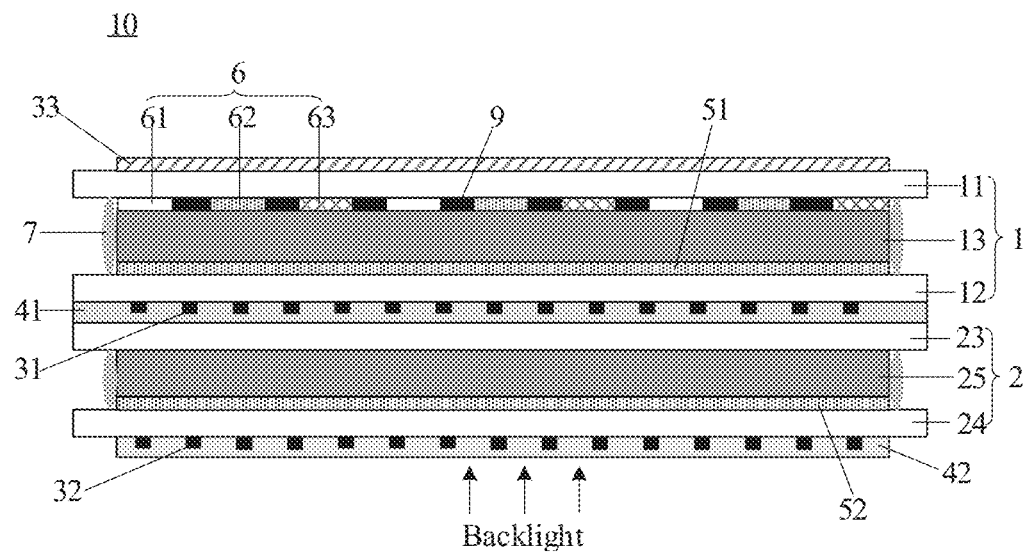
FIG. 3 is a second schematic cross-sectional view of a display panel provided by an embodiment of the present disclosure.

In addition, according to Table 1, in the case where the first polarizer 31 and the second polarizer 32 are both transmissive polarizers, the light transmittance is 28.5% which is lower than the light transmittance in the case where the first polarizer 31 is a transmissive polarizer and the second polarizer 32 is a WGP (that is, the embodiment shown in FIG. 2A of the present disclosure), this is because in the embodiments shown in FIG. 2A and FIG. 3 of the present disclosure, the second polarizer 32 is the WGP, a part of light that does not pass through the second polarizer 32 is reflected multiple times between the second polarizer 32 and the reflective sheet in the backlight source, which can increase the amount of light passing through the second polarizer 32. In addition, in the case where the first polarizer 31 and the second polarizer 32 are both transmissive polarizers, the reuse of the reflective sheet in the backlight source cannot be realized. However, in the process of light from the backlight source passing through the transmissive first polarizer 31 and second polarizer 32 in sequence, a part of the light passes through the first polarizer 31 and the second polarizer 32, and the other part of the light is absorbed by the first polarizer 31 and the second polarizer 32, that is, the other part of the light is absorbed by two times, which causes a large amount of loss of the light, and the reflective sheet of the backlight source cannot play the function of reflecting the light again.

It should be noted that in the embodiments of the present disclosure, for example, in the embodiment shown in FIG. 2A, in the case where the third polarizer 33 is the above-mentioned transmissive polarizer, because the transmissive polarizer includes an organic material, the third polarizer 33 cannot be disposed on the side of the first substrate 11 close to the second substrate 12, that is, the third polarizer 33 cannot be disposed in the liquid crystal cell, so as to prevent the organic material from being unable to withstand high temperature during the cell assembling process and damaging the third polarizer.

Of course, in the embodiment shown in FIG. 2A, in the case where the first polarizer 31 is the above-mentioned transmissive polarizer, the position of the first polarizer 31 includes, but is not limited to, the position between the second substrate 12 and the third substrate 23. For example, in some embodiments, the first polarizer 31 is disposed on a side of the third substrate 23 away from the second substrate 12, or the first polarizer 31 is disposed on a side of the second substrate 12 away from the third substrate 23.

Figure 2B:
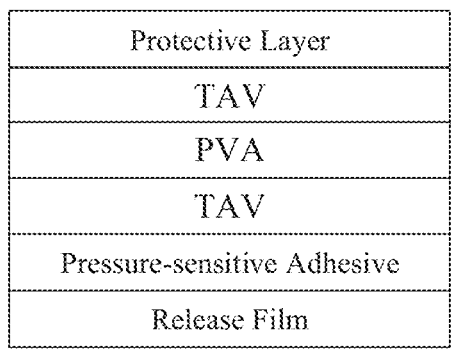
FIG. 2B is a schematic diagram of a transmissive polarizer in an embodiment of the present disclosure.

For example, in the case where the first polarizer 31 is the transmissive polarizer, as shown in FIG. 2B, the first polarizer 31 includes a polyvinyl alcohol (PVA) film which is capable of generating polarized light, such as a polyvinyl alcohol (PVA) film including dichroic dye iodine, and further includes two triacetate cellulose (TAV) protection films respectively on two sides of the polyvinyl alcohol (PVA) film. For example, the first polarizer 31 further includes a pressure-sensitive adhesive on a side of any TAV protection film away from the PVA film, a release film covering the pressure-sensitive adhesive and in contact with the pressure-sensitive adhesive, and a protection layer on the outermost layer of the transmissive polarizer.

Figure 2C:
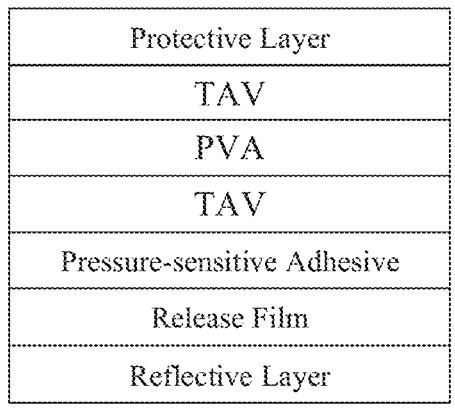
FIG. 2C is a schematic diagram of a reflective polarizer in an embodiment of the present disclosure.

For example, in some embodiments, the reflective polarizer in the embodiments of the present disclosure may be a non-wire grid polarizer, such as a sheet-shaped reflective polarizer. For example, as shown in FIG. 2C, the reflective polarizer includes the above-mentioned PVA film, the TAV protection film, the pressure-sensitive adhesive, the release film, and a reflective layer on the side of the release film away from the PVA film. This kind of reflective polarizer can also improve the light transmittance of the display panel to a certain extent, but compared to this kind of reflective polarizer, in the case the reflective polarizer is the WGP, the display panel 10 can obtain higher light transmittance.

For example, as shown in FIG. 2A, the display panel 10 further includes a protection layer 42, and the first protection layer 42 covers the second polarizer 32. In the case where the second polarizer 32 is the WGP, it is very susceptible to be damaged, and the first protection layer 42 can prevent the WGP from being damaged, thereby prolonging the service life of the display panel 10. For example, the material of the first protection layer 42 is silicon oxide or silicon nitride, and the thickness of the first protection layer 42 is greater than or equal to 4500 angstroms to form a dense protection layer to better prevent the WGP from scratching while avoiding external moisture getting into the WGP, in which the external moisture can cause thermal expansion of the WGP, and cause damage to the WGP. If the thickness of the first protection layer 42 is too small, the water and oxygen barrier effect will be reduced. The thickness of the first protection layer 42 is greater than or equal to 4500 angstroms to obtain a better water and oxygen barrier effect.

For example, the display panel 10 further includes an adhesive 7 for bonding the first substrate 11 and the second substrate 12 and bonding the third substrate 23 and the fourth substrate 24 in the assembling process, so as to form the display liquid crystal panel 1 and the light control panel 2.

For example, the first substrate 11, the second substrate 12, the third substrate 23, and the fourth substrate 24 may all be glass substrates, or quartz substrates, etc., or may be flexible substrates such as polyimide substrates for forming flexible display panels.

For example, FIG. 3 is a second schematic cross-sectional view of a display panel provided by an embodiment of the present disclosure. As shown in FIG. 3, the difference between the display panel and the display panel shown in FIG. 2A is that the first polarizer 31 is located between the second substrate 12 and the third substrate 23, and the first polarizer 31 is a reflective polarizer, for example, is a wire-grid polarizer (WGP). In this case, light reflected by the first polarizer 31 is depolarized by the second polarizer 32 and then is reflected again by the second polarizer 32 and the first polarizer 31. The light is reflected multiple times between the first polarizer 31 and the second polarizer 32, which significantly increases the light transmittance. It can be seen from Table 1 that according to the simulation test on the light control panel 2, the light transmittance of the light control panel 2 in this embodiment can reach 30.78%.

For example, as shown in FIG. 3, the display panel 10 further includes a second protection layer 41, the second protection layer 41 covers the first polarizer 31 to prevent the WGP from being damaged and thereby prolong the service life of the display panel 10. The material and thickness of the second protection layer 41 are the same as the material and thickness of the first protection layer 42, and the foregoing descriptions can be referred to.

It should be noted that in the embodiment shown in FIG. 3, the first polarizer 31 is a reflective polarizer. In this case, the first polarizer 31 is located on the side of the second substrate 12 away from the first substrate 11 to avoid generating an interference electric field between the first polarizer 31 made of a metal material and the display array component 51, so as to prevent the interference electric field from affecting the display effect. Other unmentioned features of the display panel shown in FIG. 3 are the same as those of the display panel shown in FIG. 2A, please refer to the previous descriptions.

Figure 4:
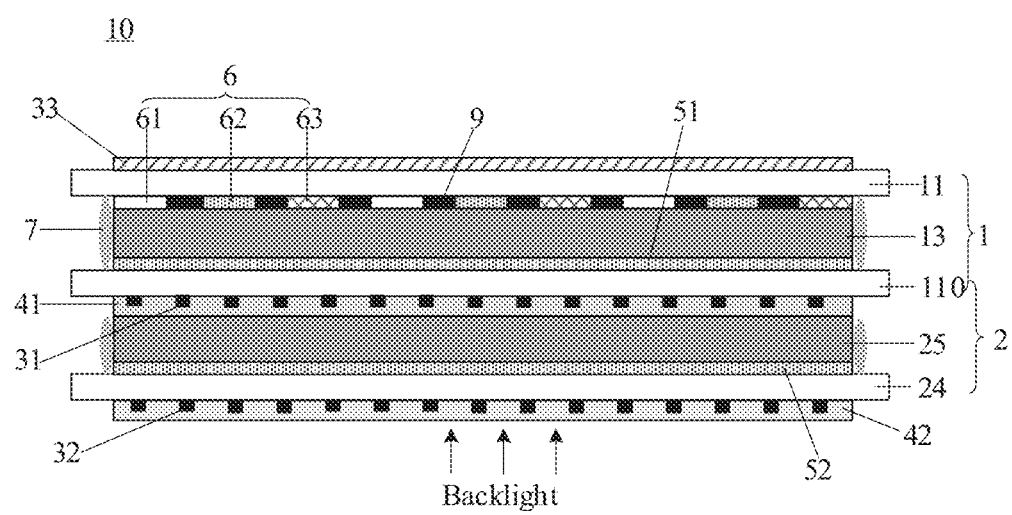
FIG. 4 is a third schematic cross-sectional view of a display panel provided by an embodiment of the present disclosure.

For example, FIG. 4 is a third schematic cross-sectional view of a display panel provided by an embodiment of the present disclosure. As shown in FIG. 4, the difference between the display panel and the display panel shown in FIG. 2A is that the first polarizer 31 is a reflective polarizer such as a WGP, and the first polarizer 31 is opposite to the second polarizer 32; the second substrate 12 and the third substrate 23 constitute an integral structure, and the integral structure serves as a common substrate 110, and the display liquid crystal panel 1 and the light control panel 2 share the common substrate 110. The first substrate 11 is a color filter substrate, and a color filter layer 9 is provided on a first side of the first substrate 11 close to the common substrate 110. The common substrate 110 is a display array substrate, a display array component 51 is provided on a first side of the common substrate 110 close to the first substrate 11. The first polarizer 31 is provided on a second side of the common substrate 110 close to the fourth substrate. Because the display panel 10 of this embodiment has three substrates, the display panel 10 is thinned, the manufacture process of the display panel can be simplified, and the cost can be saved. In addition, because the first polarizer 31 is disposed on the second side of the common substrate 110 close to the fourth substrate, it is possible to avoid generating the interference electric field between the first polarizer 31 made of a metal material and the display array component 51 of the common substrate 110, and therefore prevent the interference electric field from affecting the display effect. In this embodiment, the third polarizer 33 is a transmissive polarizer, the third polarizer 33 is in an integral sheet structure instead of a wire grid structure, and the material of the third polarizer includes an organic material. For example, the third polarizer 33 is an iodine-based polarizer to obtain a higher light transmittance. In this case, while the above-mentioned effect of improving the light transmittance of the display panel 10 can be achieved, the third polarizer 33 is located on the side of the first substrate away from the common substrate, so as to prevent the third polarizer 33 from being damaged during the cell assembling process. Other unmentioned features and technical effects of the display panel shown in FIG. 4 are the same as those in FIG. 2A, please refer to the previous descriptions.

Figure 5:
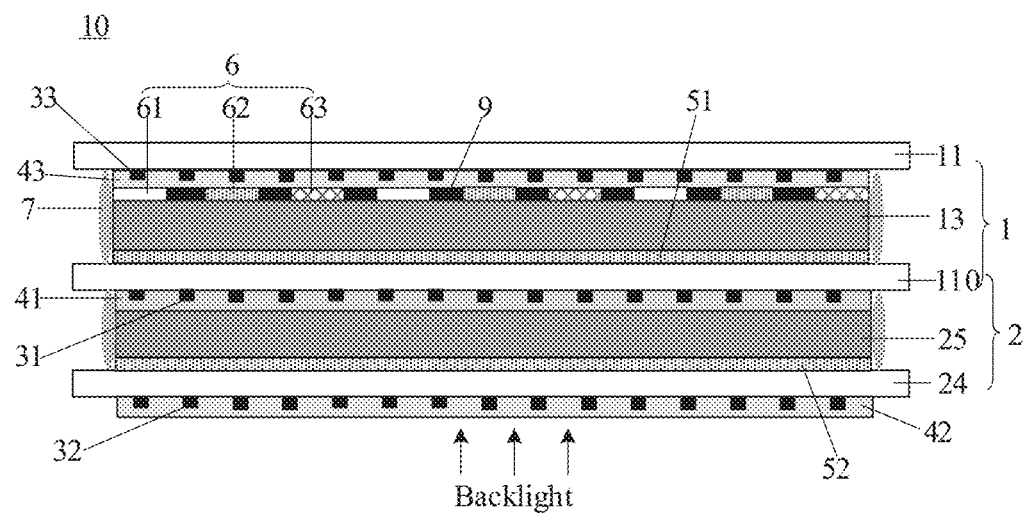
FIG. 5 is a fourth schematic cross-sectional view of a display panel provided by an embodiment of the present disclosure.

FIG. 5 is a fourth schematic cross-sectional view of a display panel provided by an embodiment of the present disclosure. As shown in FIG. 5, the difference between the display panel and the display panel shown in FIG. 4 is that a color filter layer 9 is provided on the first side of the first substrate 11 close to the common substrate 110, and the third polarizer 33 is a reflective polarizer, such as a wire-grid polarizer (WGP), and is located on the first side of the first substrate 11 and on the side of the color filter layer 9 close to the first substrate 11. The WGP cannot be disposed on the first side of the first substrate 11 away from the common substrate 110, so as to prevent light reflection generated by the WGP from affecting the display. The WGP may be disposed on the second side of the first substrate 11 close to the common substrate 110 to reduce the reflection of external light. If the WGP (that is, the third polarizer 33) is disposed on a side of the color filter layer 9 away from the first substrate 11, in the manufacture process, the color filter layer 9 is formed first, and then the WGP is formed on the color filter layer, the forming process of the WGP usually includes a nanoimprint step, and in this process, the nanoimprint step may damage or deform the color filter layer 9. Therefore, in this embodiment, while the above-mentioned effect of improving the light transmittance of the display panel 10 can be achieved, the third polarizer 33 is located on the first side of the first substrate 11 and is located on the side of the color filter layer 9 close to the first substrate 11, which can prevent the above-mentioned damage to the color filter layer 9. Other unmentioned features of the display panel shown in FIG. 5 are the same as those in FIG. 4, please refer to the previous descriptions.

Figure 6:
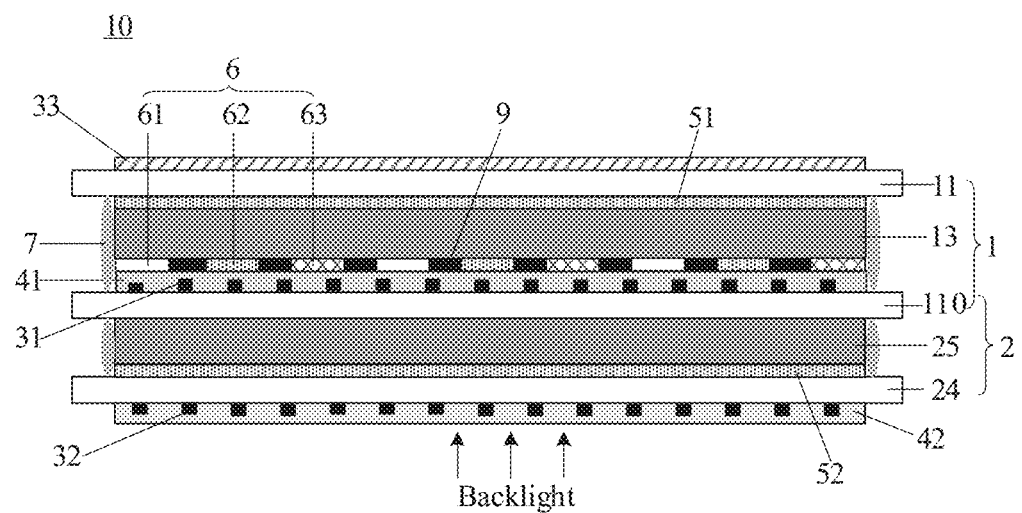
FIG. 6 is a fifth schematic cross-sectional view of a display panel provided by an embodiment of the present disclosure.
Figure 7:
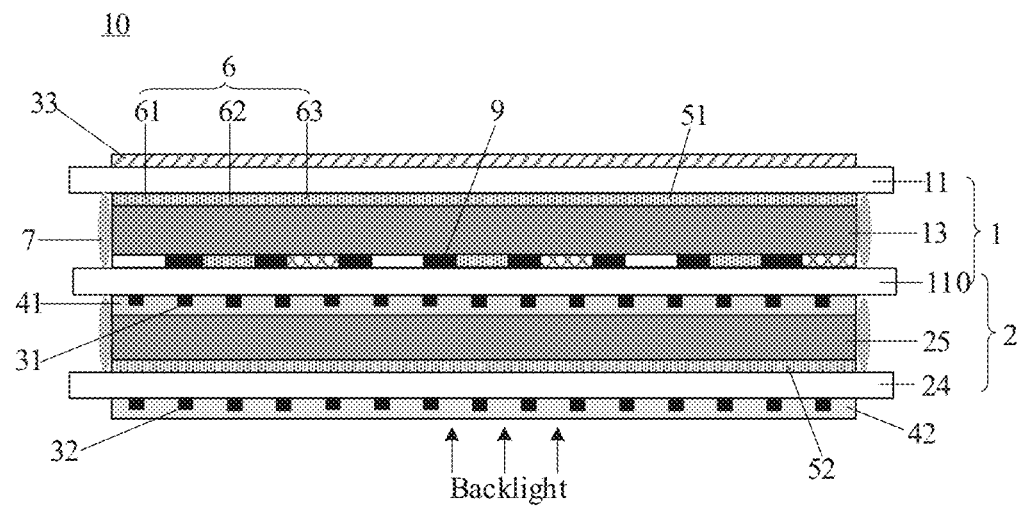
FIG. 7 is a sixth schematic cross-sectional view of a display panel provided by an embodiment of the present disclosure.

FIG. 6 is a fifth schematic cross-sectional view of a display panel provided by an embodiment of the present disclosure, and FIG. 7 is a sixth schematic cross-sectional view of a display panel provided by an embodiment of the present disclosure. As shown in FIG. 6, the difference between the display panel and the display panel shown in FIG. 4 is that the first substrate 11 is a display array substrate, and a display array component 51 is provided on the second side of the first substrate 11 close to the common substrate 110. The third polarizer 33 is located on the side of the first substrate 11 away from the common substrate 110. The third polarizer 33 is a transmissive polarizer. The third polarizer 33 is in an integral sheet structure instead of a wire grid structure. The material of the polarizer 33 includes an organic material. For example, the third polarizer 33 is an iodine-based polarizer to help to increase the light transmittance of the display panel 10. The common substrate 110 is a color filter substrate. A color filter layer 9 is provided on the first side of the common substrate 110 close to the first substrate 11; the first polarizer 31 is located on the first side of the common substrate 110 close to the first substrate 11 and is located on the side of the color filter layer 9 close to the common substrate 110. Therefore, while the above-mentioned effect of improving the light transmittance of the display panel 10 is achieved, it is possible to prevent the color filter layer 9 from being damaged during the manufacture process of the display panel, similar to the embodiment shown in FIG. 5. Alternatively, as shown in FIG. 7, the first polarizer 31 is disposed on a second side of the common substrate 110 close to the fourth substrate 24. The display panel 10 shown in FIG. 7 achieves the same or similar technical effects as the display panel 10 shown in FIG. 4. The other unmentioned features and technical effects of the panels shown in FIG. 6 and FIG. 7 are the same as those in FIG. 4, please refer to the previous descriptions.

At least one embodiment of the present disclosure provides a display apparatus, the display apparatus includes any display panel provided by the embodiments of the present disclosure.

Figure 8:
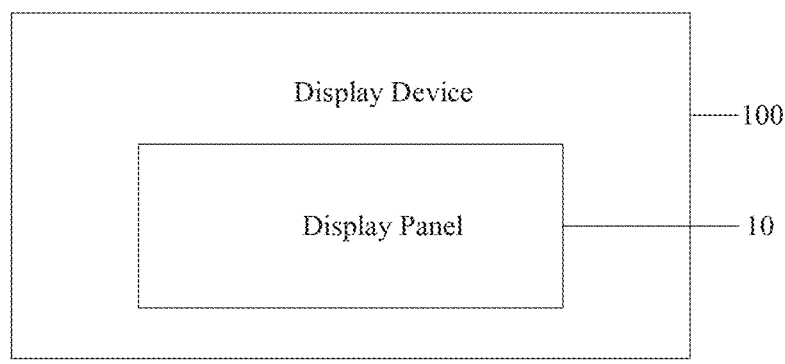
FIG. 8 is a schematic diagram of a display apparatus provided by an embodiment of the present disclosure.

FIG. 8 is a schematic diagram of a display apparatus provided by an embodiment of the disclosure. As shown in FIG. 8, the display apparatus 100 includes any display panel 10 provided by the embodiments of the present disclosure. The display apparatus 100 is a liquid crystal display apparatus. For example, the display apparatus 100 may be implemented as the following products: a mobile phone, a tablet computer, a display, a notebook computer, an ATM machine, or other products or components with display functions. The display apparatus 10 can control the direction or intensity of the backlight incident to the display liquid crystal panel 1 and has a high light transmittance.

At least one embodiment of the present disclosure provides a manufacture method of a display panel, the method includes: forming a display liquid crystal panel and a light control panel that are stacked, in which the display liquid crystal panel includes a first substrate and a second substrate that are opposite to each other, and a display liquid crystal layer between the first substrate and the second substrate; the light control panel includes a third substrate and a fourth substrate that are opposite to each other, and a light control liquid crystal layer between the third substrate and the fourth substrate; and the second substrate and the third substrate are between the first substrate and the fourth substrate; forming a first polarizer; forming a second polarizer, in which the light control liquid crystal layer is between the first polarizer and the second polarizer; and forming a third polarizer, in which the first polarizer is between the second polarizer and the third polarizer, and the display liquid crystal layer is between the first polarizer and the third polarizer; the first polarizer, the second polarizer, and the third polarizer are configured to allow backlight to emit out of the display panel after passing through the second polarizer, the first polarizer, and the third polarizer in sequence.

Exemplarily, FIGS. 9A-9M are schematic diagrams of a manufacture method of a display panel provided by an embodiment of the present disclosure. In this embodiment, the second substrate and the third substrate are integrated into an integral structure. The integral structure serves as a common substrate, the display liquid crystal panel and the light control panel share the common substrate, and the common substrate is a display array substrate. The manufacture method includes the following steps.

Figure 9A:
FIG. 9A-FIG. 9M are schematic diagrams of a manufacture method of a display panel provided by an embodiment of the present disclosure.

As shown in FIG. 9A, a common substrate 110 is provided, and a display array component 51 is formed on the first side of the common substrate 110. The display array component 51 includes components, for example, a pixel drive circuit, such as a thin film transistor (TFT), etc., for driving and controlling the display state of the liquid crystal panel 1, a semiconductor process can be used to form the display array component 51, and those skilled in the art can refer to conventional techniques.

Figure 9B:
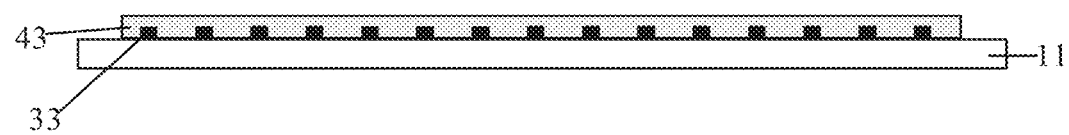

As shown in FIG. 9B, a first substrate 11 is provided, and a third polarizer 33 is formed on the first side of the first substrate 11. The third polarizer 33 is a wire-grid polarizer (WGP). For example, the forming process of the WGP includes: forming a metal layer; forming an organic layer on the metal layer; forming an etching barrier layer on the organic layer using a nanoimprint process, and using the etching barrier layer as a mask to etching the metal layer to form the WGP.

Figure 9C:
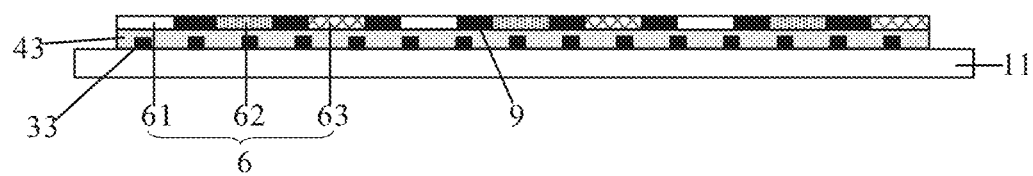

As shown in FIG. 9C, after forming the wire-grid polarizer (that is, the third polarizer 33), a color filter layer 9 is formed on the side of the third polarizer 33 away from the first substrate 11. For the specific structure of the color filter layer 9, please refer to the descriptions in the previous embodiments, which is not be repeated here. In the above-mentioned manufacturing process of the WGP, the nanoimprint step may damage or deform the color filter layer 9. Therefore, in this embodiment, because after the wire-grid polarizer (that is, the third polarizer 33) is formed, the color filter layer 9 is formed on the side of the third polarizer 33 away from the first substrate 11, and the color filter layer 9 can be prevented from being damaged by the above-mentioned nanoimprint step.

Figure 9D:
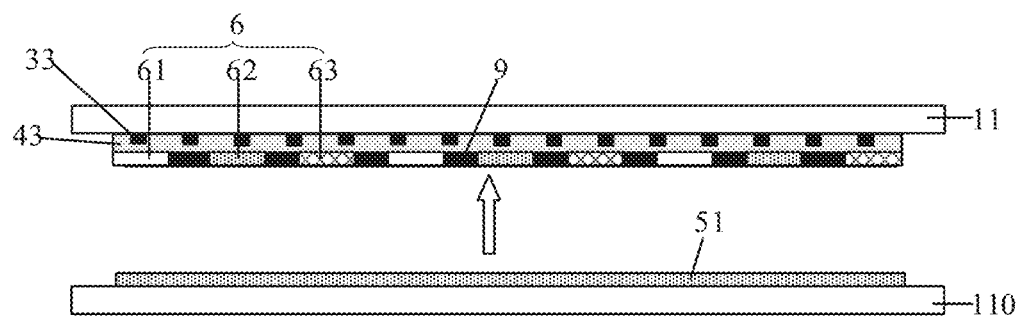
Figure 9E:
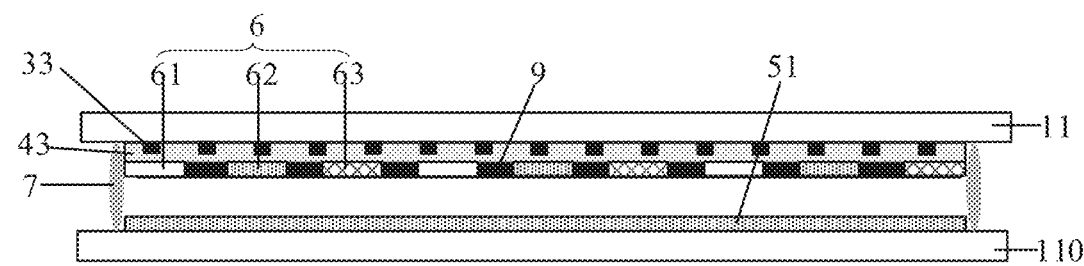

As shown in FIG. 9D, the first substrate 11 and the common substrate 110 are assembled to form a display liquid crystal panel as shown in FIG. 9E. The color filter layer 9 and the display array component 51 are located between the common substrate 110 and the first substrate 11 and are opposite to each other.

Figure 9F:
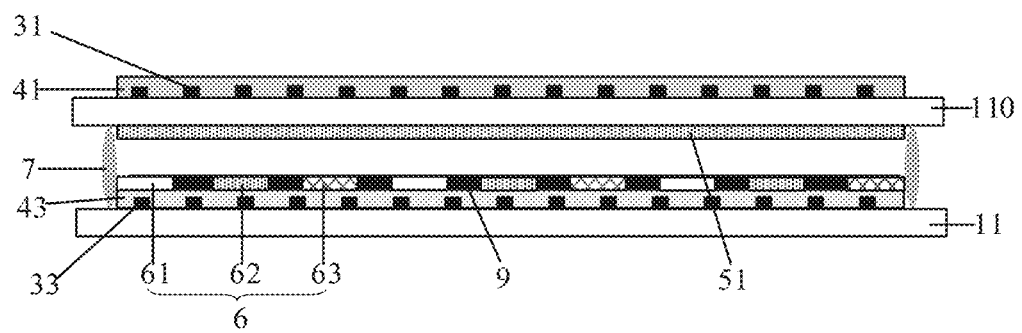

As shown in FIG. 9F, after assembling the first substrate 11 and the common substrate 110, the first polarizer 31 is formed on the second side of the common substrate 110 opposite to the first side. For example, the first polarizer 31 is a reflective polarizer, such as a WGP, and the first polarizer 31 is opposite to the second polarizer 32 so as to increase the light transmittance of the display panel. For specific technical effects, please refer to the previous descriptions, which is not repeat here. If the WGP is formed on the second side of the common substrate 110 first, then the display array component 51 is formed, and then the cell is assembled, in order to prevent the WGP from being damaged in the process of forming the display array component 51, it is required to form a protection film covering the WGP, and it is required to remove the protection film after finishing the assembling process, which increases the process steps. Therefore, in this embodiment, the display array component 51 is formed on the common substrate 110 first, and then the first substrate 11 and the common substrate 110 are assembled to form a cell, and then WGP is formed on the common substrate 110, thereby simplifying the manufacture process of the display panel, improving production efficiency and reducing production costs. At least the process of forming the protection film to prevent damage to the WGP and the process of removing the protection film can be omitted.

Figure 9G:
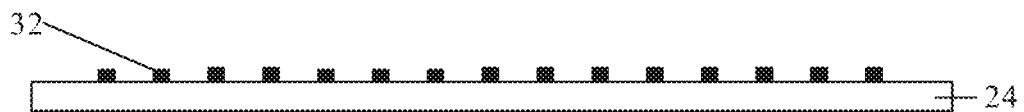

As shown in FIG. 9G, a fourth substrate 24 is provided, and a second polarizer 32 is formed on the first side of the fourth substrate 24. For example, the second polarizer 32 is a reflective polarizer, such as a WGP. For the specific manufacture process, please refer to the previous descriptions.

Figure 9H:
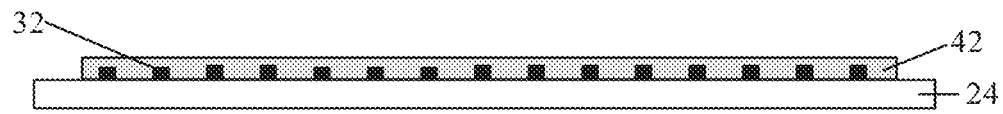

As shown in FIG. 9H, a first protection layer 42 covering the second polarizer 32 is formed. The material of the first protection layer 42 is, for example, an inorganic material such as silicon oxide or silicon nitride, for example, which can be formed by a deposition method. The embodiments of the present disclosure do not limit the material of the first protection layer 42.

Figure 9I:
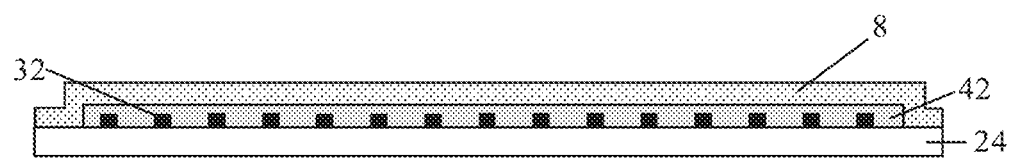

As shown in FIG. 9I, the manufacture method further includes: forming a sacrifice protection layer 8 covering the second polarizer 32 before forming the light control array component. For example, the sacrifice protection layer 8 is an organic layer, for example, the material of the organic layer is a resin material or a photoresist material to facilitate subsequent removal of the sacrifice protection layer 8. Of course, the embodiments of the present disclosure do not limit this.

Figure 9J:
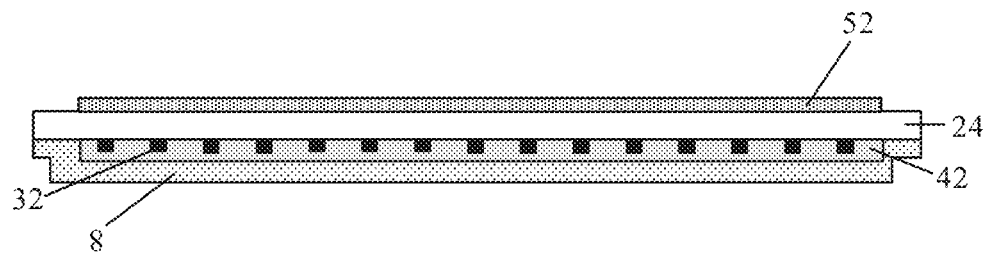

As shown in FIG. 9J, after forming the second polarizer 32, for example, after forming the sacrifice protection layer 8, the light control array component 52 is formed on the second side of the fourth substrate 42 opposite to the first side. The light control array component 52 may be formed by a semiconductor process, and the conventional technology in the art can be referred to for details.

Figure 9K:
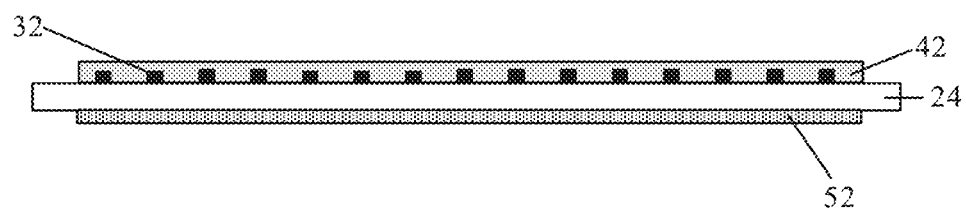

As shown in FIG. 9K, after forming the light control array component 52, the sacrifice protection layer 8 is removed. For example, the sacrifice protection layer 8 can be removed by a peeling method.

Figure 9L:
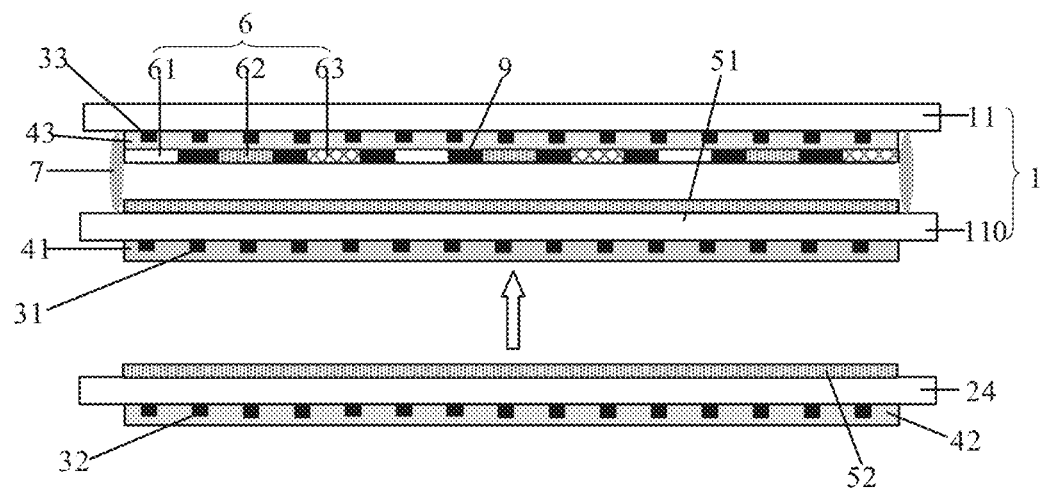
Figure 9M:
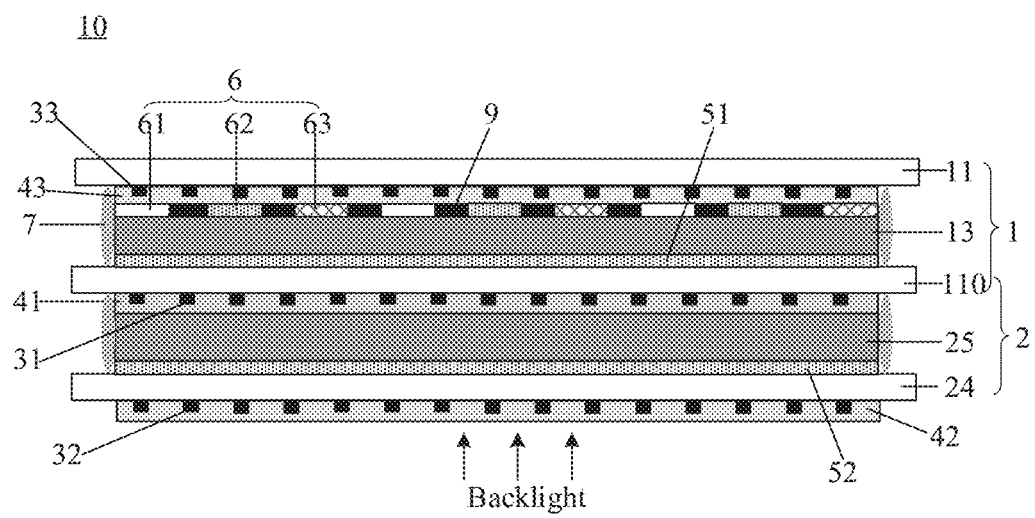

As shown in FIG. 9L, the fourth substrate 24 and the common substrate 110 are assembled to form a light control panel, and the light control array component 52 is located on the side of the fourth substrate 24 close to the common substrate 110. Liquid crystals are injected between the first substrate 11 and the common substrate 110 and between the fourth substrate 24 and the common substrate 110, thereby forming the display panel 10 shown in FIG. 9M, that is, the display panel 10 shown in FIG. 5. In the display panel 10, the first substrate 11 is a color filter substrate, and the common substrate 110 is a display array substrate.

In the process of manufacturing the display panel shown in FIG. 6, after the first polarizer 31 is formed, a color filter layer 9 is formed on the first side of the first polarizer 31 away from the common substrate 110 to prevent the color filtering layer 9 from being damaged in the process of forming the WGP. For the steps of forming other corresponding structures of the display panel shown in FIG. 6, reference may be made to the sequence of the steps in the embodiments of the above-mentioned manufacture method.

FIGS. 10A-FIG. 10E are schematic diagrams of another manufacture method of a display panel provided by an embodiment of the present disclosure.

Figure 10A:
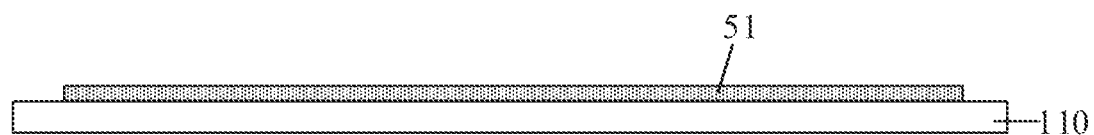
FIG. 10A-FIG. 10E are schematic diagrams of another manufacture method of a display panel provided by an embodiment of the present disclosure.

As shown in FIG. 10A, a common substrate 110 is provided, and a display array component 51 is formed on the first side of the common substrate 110. The display array component 51 includes components, for example, includes a pixel drive circuit; for example, the drive circuit includes a thin film transistor (TFT), etc. for driving and controlling the display state of the liquid crystal panel 1, a semiconductor process may be adopted to form the display array component 51, and those skilled in the art can refer to conventional techniques.

Figure 10B:
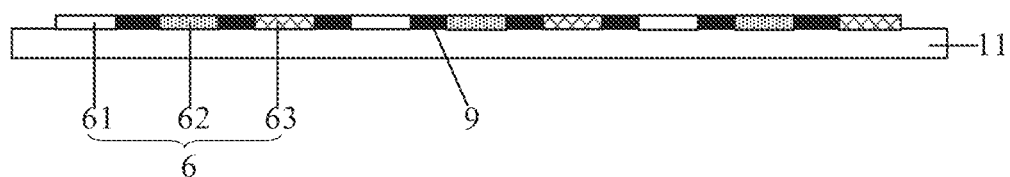

As shown in FIG. 10B, providing a first substrate 11, and forming a color filter layer 9 on the first side of the first substrate 11.

Figure 10C:
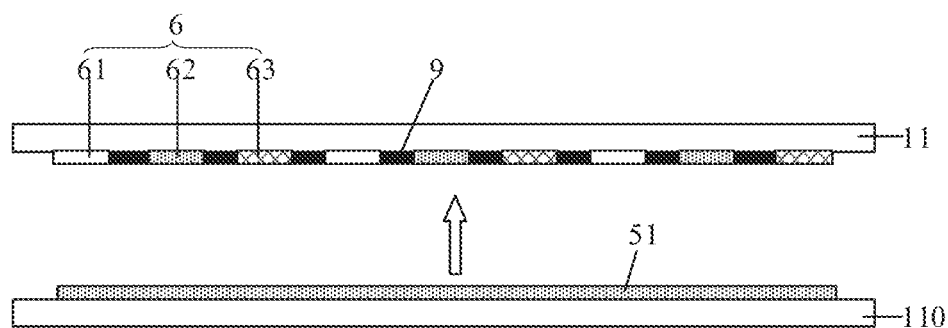
Figure 10D:
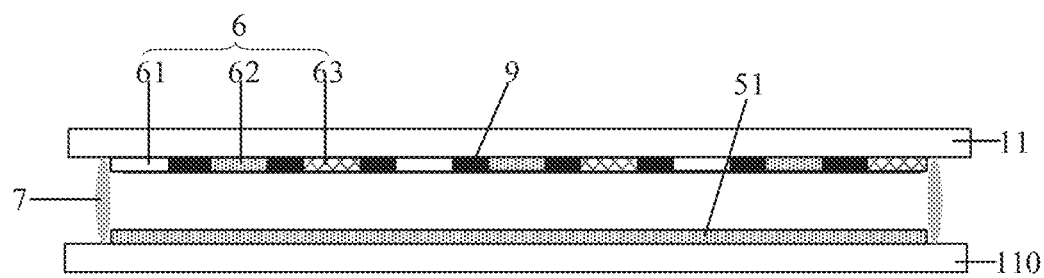

As shown in FIG. 10C and FIG. 10D, the first substrate 11 and the common substrate 110 are assembled to form a display liquid crystal panel; the color filter layer 9 and the display array component 51 are located between the common substrate 110 and the first substrate 11 and are opposite to each other.

Figure 10E:
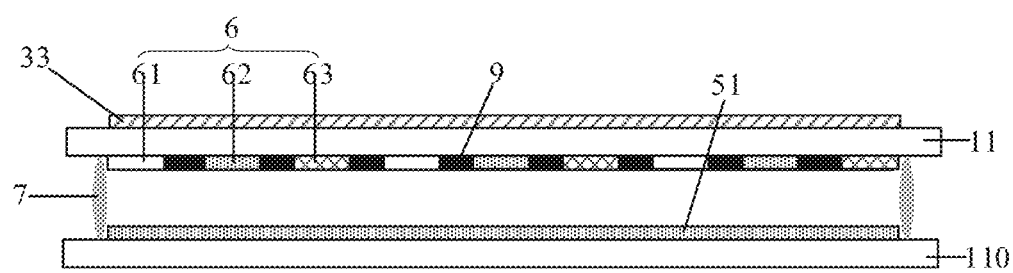

As shown in FIG. 10E, after assembling the first substrate 11 and the common substrate 110, a third polarizer 33 is formed on the second side of the first substrate 11 away from the common substrate 110; the third polarizer 33 is a transmissive polarizer. The third polarizer 33 is in an integral sheet structure instead of a wire grid structure, and the material of the third polarizer 33 includes an organic material. For example, the third polarizer 33 is an iodine-based polarizer or a dye-based polarizer. For example, the third polarizer 33 is directly attached to the second side of the first substrate 11.

Then, the steps in the descriptions of FIGS. 9F-9M are performed as subsequent manufacture steps to form the display panel 10 shown in FIG. 4.

For the technical effects of the structure that are not mentioned in the embodiments of the manufacture method, please refer to the descriptions in the embodiments of the display panel.

What is claimed is:

1. A display panel, comprising:
  a display liquid crystal panel and a light control panel that are stacked, wherein the display liquid crystal panel comprises a first substrate and a second substrate that are opposite to each other, and a display liquid crystal layer between the first substrate and the second substrate; the light control panel comprises a third substrate and a fourth substrate that are opposite to each other, and a light control liquid crystal layer between the third substrate and the fourth substrate; and the second substrate and the third substrate are between the first substrate and the fourth substrate;
  a first polarizer;
  a second polarizer, wherein the light control liquid crystal layer is between the first polarizer and the second polarizer; and
  a third polarizer, wherein the first polarizer is between the second polarizer and the third polarizer, and the display liquid crystal layer is between the first polarizer and the third polarizer; the first polarizer, the second polarizer, and the third polarizer are configured to allow backlight to emit out of the display panel after passing through the second polarizer, the first polarizer, and the third polarizer in sequence;
  the second polarizer is a reflective polarizer, and the reflective polarizer is a wire-grid polarizer (WGP) with a plurality of stripe grids;
  the second substrate and the third substrate constitute an integral structure, the integral structure serves as a common substrate, and the display liquid crystal panel and the light control panel share the common substrate;
  the second polarizer is on a side of the fourth substrate away from the common substrate;
  the first polarizer is a wire-grid polarizer (WGP) with a plurality of stripe grids, and is on the common substrate;
  the display panel the further comprises:
  a first protection layer, on the side of the fourth substrate away from the common substrate and covering the second polarizer; and
  a second protection layer, on the common substrate and covering the first polarizer.

2. The display panel according to claim 1, wherein the first polarizer is a reflective polarizer.

3. The display panel according to claim 1, wherein a material of the first protection layer is silicon oxide or silicon nitride, and a thickness of the first protection layer is greater than or equal to 4500 angstroms.

4. The display panel according to claim 2, wherein
the common substrate is a display array substrate, and a display array component is provided on a first side of the common substrate close to the first substrate; and
the first polarizer is on a second side of the common substrate close to the fourth substrate, and the second protection layer is on the second side of the common substrate close to the fourth substrate and covers the first polarizer.

5. The display panel according to claim 4, wherein the first substrate is a color filter substrate, the third polarizer is on a side of the first substrate away from the common substrate, and the third polarizer is a transmissive polarizer.

6. The display panel according to claim 4, wherein
the first substrate is a color filter substrate, and a color filter layer is provided on a first side of the first substrate close to the common substrate; and
the third polarizer is a reflective polarizer, and is on the first side of the first substrate and on a side of the color filter layer close to the first substrate.

7. The display panel according to claim 2, wherein
the common substrate is a color filter substrate, and a color filter layer is provided on a first side of the common substrate close to the first substrate; and
the first polarizer is on the first side of the common substrate close to the first substrate and on a side of the color filter layer close to the common substrate, or, the first polarizer is on a second side of the common substrate close to the fourth substrate.

8. The display panel according to claim 7, where in a case where the first polarizer is on the first side of the common substrate close to the first substrate and on a side of the color filter layer close to the common substrate, the second protection layer is between the color filter layer and the first polarizer and covers the first polarizer;
in a case where the first polarizer is on the second side of the common substrate close to the fourth substrate, the second protection layer is on the second side of the common substrate close to the fourth substrate and covers the first polarizer.

9. The display panel according to claim 7, wherein the first substrate is a display array substrate, the third polarizer is on a side of the first substrate away from the common substrate, and the third polarizer is a transmissive polarizer.

10. The display panel according to claim 1, wherein the fourth substrate is a light control array substrate, a light control array component is provided on a first side of the fourth substrate close to the liquid crystal display panel.

11. The display panel according to claim 1, wherein
a polarization direction of the first polarizer is perpendicular to a polarization direction of the second polarizer; and
a polarization direction of the third polarizer is perpendicular to the polarization direction of the second polarizer.

12. A display apparatus, comprising:
the display panel according to claim 1; and
a backlight source which is on a side of the light control panel away from the display liquid crystal panel, and is configured to allow backlight from the backlight source enter the display liquid crystal panel after passing through the light control panel.

13. A manufacture method of a display panel, comprising:
forming a display liquid crystal panel and a light control panel that are stacked, wherein the display liquid crystal panel comprises a first substrate and a second substrate that are opposite to each other, and a display liquid crystal layer between the first substrate and the second substrate; the light control panel comprises a third substrate and a fourth substrate that are opposite to each other, and a light control liquid crystal layer between the third substrate and the fourth substrate; and the second substrate and the third substrate are between the first substrate and the fourth substrate;
forming a first polarizer;
forming a second polarizer, wherein the light control liquid crystal layer is between the first polarizer and the second polarizer; and
forming a third polarizer, wherein the first polarizer is between the second polarizer and the third polarizer, and the display liquid crystal layer is between the first polarizer and the third polarizer; the first polarizer, the second polarizer, and the third polarizer are configured to allow backlight to emit out of the display panel after passing through the second polarizer, the first polarizer, and the third polarizer in sequence;
the second polarizer is a reflective polarizer, and the reflective polarizer is a wire-grid polarizer (WGP) with a plurality of stripe grids;
the second substrate and the third substrate constitute an integral structure, the integral structure serves as a common substrate, and the display liquid crystal panel and the light control panel share the common substrate;
the second polarizer is on a side of the fourth substrate away from the common substrate;
the first polarizer is a wire-grid polarizer (WGP) with a plurality of stripe grids, and is on the common substrate;
the display panel the further comprises:
a first protection layer, on the side of the fourth substrate away from the common substrate and covering the second polarizer; and
a second protection layer, on the common substrate and covering the first polarizer.

14. The manufacture method according to claim 13, wherein a process for forming the reflective polarizer comprises an etching process and a nanoimprint process.

* * * * *